(12) United States Patent
Tafas et al.

(10) Patent No.: US 8,398,263 B2
(45) Date of Patent: Mar. 19, 2013

(54) FILTER WHEEL

(75) Inventors: Triantafyllos Tafas, Rocky Hill, CT (US); Michael Thomas, West Hartford, CT (US)

(73) Assignee: Ikonisys, Inc., New Haven, CT (US)

( * ) Notice: Subject to any disclaimer, the term of this patent is extended or adjusted under 35 U.S.C. 154(b) by 152 days.

(21) Appl. No.: 13/009,331

(22) Filed: Jan. 19, 2011

(65) Prior Publication Data

US 2011/0280013 A1 Nov. 17, 2011

Related U.S. Application Data

(60) Provisional application No. 61/296,543, filed on Jan. 20, 2010.

(51) Int. Cl.
*F21V 14/00* (2006.01)
*G02B 5/28* (2006.01)
*G02B 27/14* (2006.01)

(52) U.S. Cl. ........... 362/232; 362/261; 362/293; 353/84
(58) Field of Classification Search .................. 362/235, 362/293, 74, 743, 748–749; 353/31
See application file for complete search history.

(56) References Cited

U.S. PATENT DOCUMENTS

| | | | | |
|---|---|---|---|---|
| 6,999,253 | B1 * | 2/2006 | Niwa et al. | 359/892 |
| 7,869,151 | B2 * | 1/2011 | Niwa et al. | 359/892 |
| 7,942,535 | B2 * | 5/2011 | Kjaer | 353/84 |

* cited by examiner

*Primary Examiner* — Tracie Y Green
(74) *Attorney, Agent, or Firm* — Kelley Drye and Warren LLP

(57) ABSTRACT

An improved filter wheel is disclosed, through embodiments, that comprises a plurality of reflector support structures formed as a unitized structure with a circular base member. In some embodiments, the filter wheel further comprises a plurality of light sources mounted on the filter wheel.

10 Claims, 4 Drawing Sheets

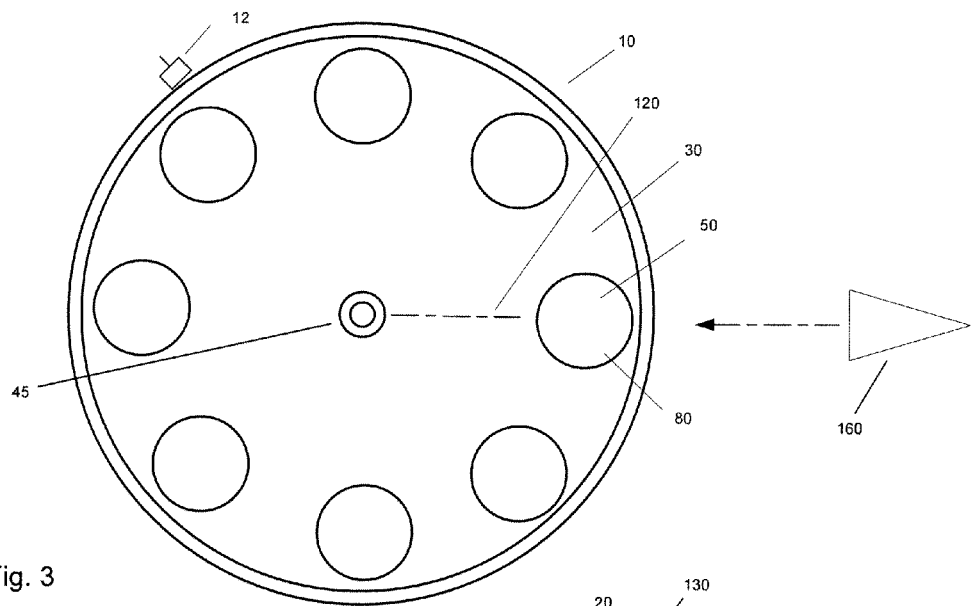
Fig. 3
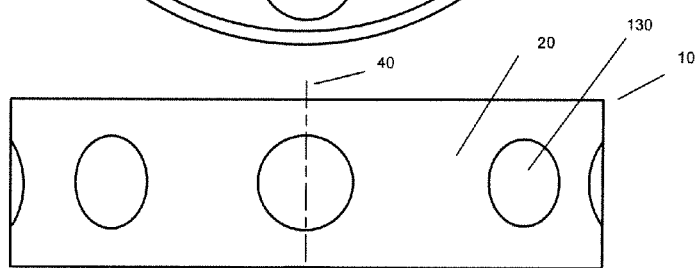
Fig. 4
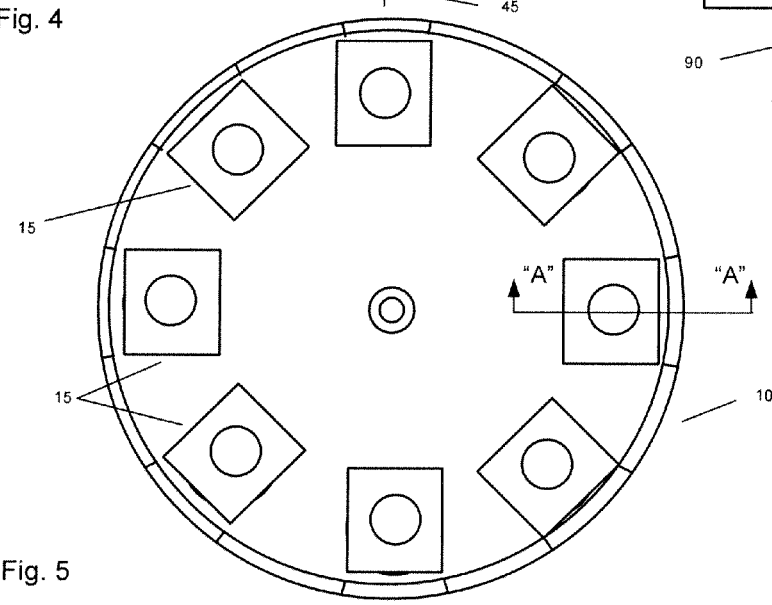
Fig. 5
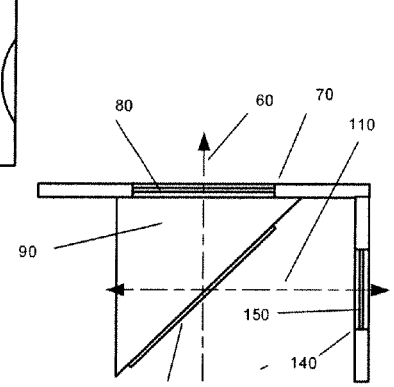
Fig. 6 Cutaway "A"

FILTER WHEEL

CROSS-REFERENCE TO RELATED APPLICATIONS

This Utility patent application claims priority of U.S. Provisional Patent Application No. 61/296,543, filed Jan. 20, 2010, which is incorporated by reference herein in its entirety.

BACKGROUND OF THE INVENTION

An epifluorescence microscope is similar to a conventional reflecting optical microscope in that both microscopes illuminate the sample and produce a magnified image of the sample. An epifluorescence microscope, however, uses the emitted fluorescent light to form an image whereas a conventional reflecting optical microscope uses the scattered illumination light to form an image. The epifluorescent microscope uses a higher intensity illumination, or excitation, light than a conventional microscope. The higher intensity excitation light is needed to excite a fluorescent molecule in the sample thereby causing the fluorescent molecule to emit fluorescent light. The excitation light has a higher energy, or shorter wavelength, than the emitted light. The epifluorescence microscope uses the emitted light to produce a magnified image of the sample. The advantage of a epifluorescence microscope is that the sample may be prepared such that the fluorescent molecules are preferentially attached to the biological structures of interest thereby producing an image of the biological structures of interest.

BRIEF SUMMARY OF INVENTION

In embodiments there is presented a filter wheel apparatus comprising: a planar circular base member with a mechanical shaft coupler located at an axis of rotation defined perpendicular to and centered on the circular base member, the circular base member penetrated by a plurality of base apertures whose centers are angularly spaced about the circumference of a circle, the centers of each of the base apertures defining an aperture axis perpendicular to plane of the aperture, the planar circular base member further comprising a corresponding plurality of reflector support structures, each of the reflector support structures being located in proximity to each of the plurality of base apertures; a plurality of dichroic reflectors that transmit light at a first band of wavelengths and reflect light at a second band of wavelengths, each of the plurality of dichroic reflectors affixed to one of the reflector support structures and thereby intercepting the aperture axis and oriented at approximately forty-five degrees angle relative to the plane of the base aperture. While forty-five degrees is preferred, other embodiments can use other angles.

In an embodiment, the filter wheel apparatus may further comprise: a right circular cylinder member surrounding and attached to the planar circular base member thereby forming a cylindrical perpendicular wall; a plurality of wall apertures formed in the cylindrical perpendicular wall at angular locations corresponding to the plurality of base apertures, each of the wall apertures defining a wall aperture axis centered on and perpendicular to the wall aperture and intercepting a corresponding dichroic reflector.

In another embodiment, the filter wheel may further provide that each the reflector support structure comprises an individual excitation light source oriented to radiate toward the dichroic reflector. The individual excitation light source may be at least one light emitting diode (LED) or laser.

BRIEF DESCRIPTION OF DRAWINGS

The present invention may be understood more fully by reference to the following detailed description of the invention, illustrative examples of specific embodiments of the invention and the appended figures of embodiments in which:

FIG. 3 is a simplified schematic diagram of a top view of an embodiment of a filter wheel.

FIG. 4 is a simplified schematic diagram of a side view of an embodiment of a filter wheel.

FIG. 5 is a simplified schematic diagram of a bottom view of an embodiment of a filter wheel.

FIG. 6 is a simplified schematic diagram of a cutaway view of an portion of an embodiment of a filter wheel.

DETAILED DESCRIPTION OF THE INVENTION

Figure 1:
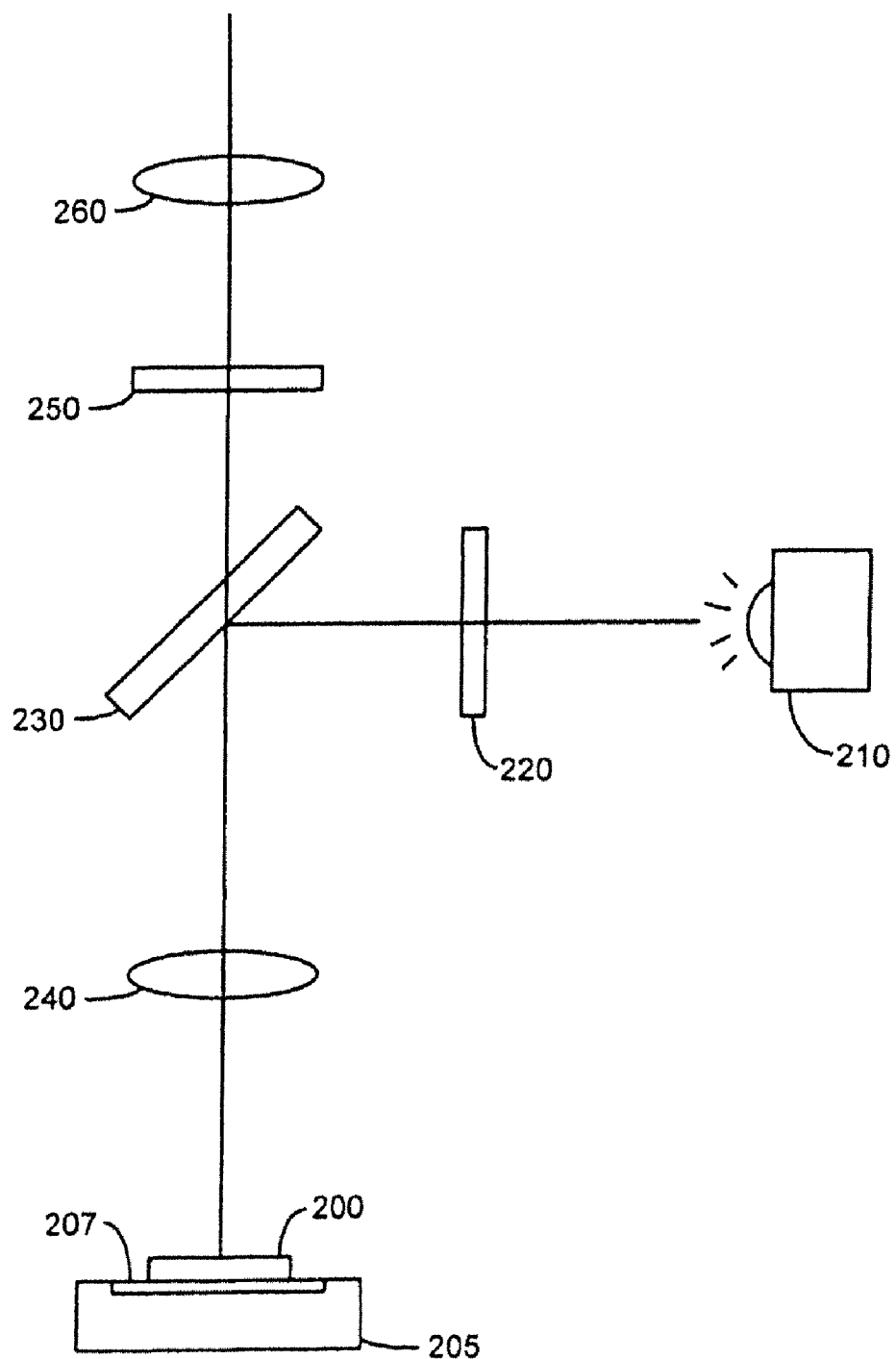
FIG. 1 is a simplified schematic diagram of the optical path of an epifluorescene microscope.

FIG. 1 is a simplified schematic view of an epifluorescene microscope. An excitation filter 220 filters excitation light generated by a light source 210. The excitation filter 220 is preferably a band-pass filter allowing excitation light frequencies, falling within a first band of wavelengths, matched to the fluorescent tags in the sample to pass through while absorbing light of wavelengths outside the pass band. The excitation light is redirected by reflection from a dichroic mirror 230 through an objective lens 240 to illuminate a sample 200 having fluorescent tag molecules. The excitation light causes the fluorescent tag molecules to emit fluorescent light, at a second band of wavelengths. The fluorescent light emitted by the tag molecules is collected by the objective lens 240 and is transmitted through the dichroic mirror 230. The dichroic minor 230 is selected to reflect the excitation light at the first band of wavelengths, emitted by the light source 210 toward the sample 200, while transmitting the emission light at the second band of wavelengths, emitted by the fluorescent tag molecules contained in the sample through the dichroic mirror. The emission light is then filtered by an emission filter 250 to remove extraneous light such as scattered excitation light. The emission light is formed into an image by an imaging lens 260.

For applications requiring the imaging of multiple tag modules having different excitation/emission wavelength characteristics, multiple sets of filters and dichroic mirrors, each having properties tuned to one set of excitation/emission wavelengths are sequentially placed in the optical path. Due to time constraints, the interchange of wavelength specific filters and dichroic reflectors must be quickly performed. The minimization of overall test duration as well as minimization of the interval between sequential exposures may be facilitated by employing a filter wheel comprising a plurality of optical component sets, each set being tuned for a specific excitation/emission light frequency pairing.

Figure 2:
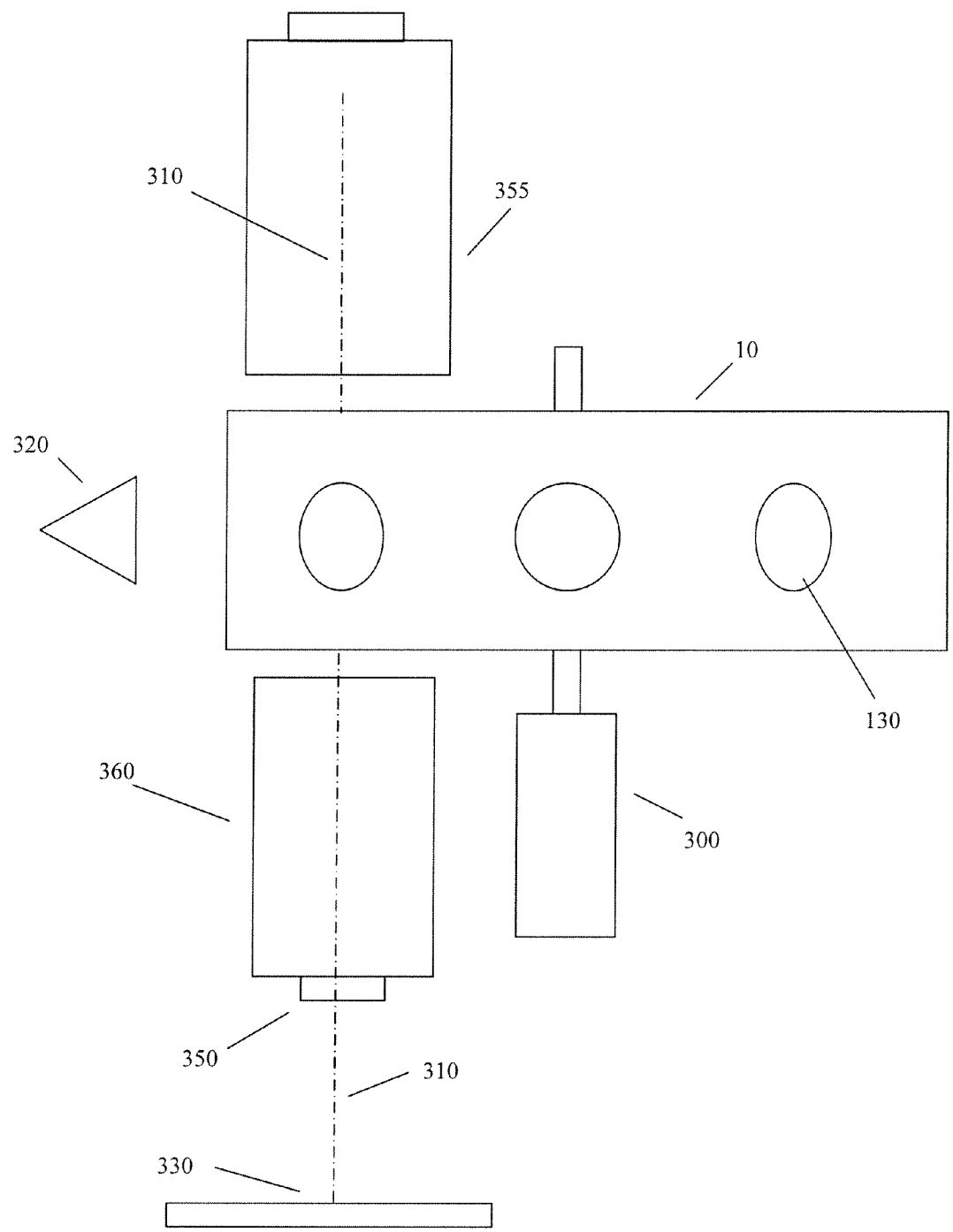
FIG. 2 is a simplified schematic diagram of an embodiment of a filter wheel positioned in a microscope system.

FIG. 2 is a simplified schematic view of a portion of a microscope system 360 comprising a filter wheel 10 that cyclically provides a sequence of optical configurations. In this embodiment, the filter wheel intercepts the microscope optical axis between the objective lens and the image portion of the microscope. Each optical configuration available on the filter wheel provides one of a predetermined set of filtering characteristics. An actuator 300 rotates the filter wheel 10 thereby inserting the succession of optical component configurations into the microscope's optical axis 310. An excitation light source 320 sequentially illuminates each set of optical component sets as the wheel 10 rotates. The excitation light is reflected down to the specimen 330 being examined. Light emitted from the specimen 330 propagates up the microscopes optical axis 310 and is transmitted via the objective lens system 350, back through the filter wheel 10 and into the image portion 355 of the microscope. Image portion 355 may comprise image forming optical components for viewing and/or image capturing devices such as cameras or sensors. In alternate embodiments, the filter wheel 10 may be located between the objective lens 350 and the specimen 330.

There are several filter wheel design approaches. The first approach, applicable to epi or reflected light illumination systems, uses a filter cube containing both the excitation and emission filters and a corresponding dichroic reflector. Multiple detachable filter cubes, each tuned to the required wavelength combination, may be mounted on a turntable-like filter wheel. A single excitation light source, located external to the filter wheel, directs light into the filter cube when it rotates into view. The filter wheel rotates, sequentially exposing successive filter cubes to the excitation light source and placing the filters and reflector in the optical path. This approach, employing detachable filter cubes, may suffer from:

1) difficulty in maintaining alignment of both the components within the cube 2) cube to cube optical transmission characteristic variations introduced by differences in individual optical component properties.

3) excessive mass of the individual filter cubes and their fixtures for mounting on the filter wheel that impact the speed and control of the assembly 4) difficulty in maintaining alignment, for each of the filter cubes, with the excitation light source.

5) sub-par light source performance due to need to generalize performance across multiple wavelengths from one end of the spectrum to the other.

An improved filter wheel 10 remedies many of the deficiencies of detachable cube designs. In an embodiment of the improved design, the cubes are eliminated and replaced by non-detachable optical component modules 15 that are an integral part of the filter wheel. The integration of the optical component modules 15 into the wheel itself improves mechanical precision and balance, reduces mass, and reduces parts count. The improved filter wheel 10 can be manufactured either by molding out of a reinforced plastic, casting or machining out of a lightweight metal such as aluminum, zinc or a suitable alloy. This configuration also provides the capability to increase the number of filter configurations within the assembly, for the same size envelope, as compared to other design approaches.

In an embodiment of the improved design, as shown in FIGS. 3 through 6, the filter wheel 10 is formed as a hollow right circular cylinder, comprising a cylindrical wall 20 attached at its top edge to a planar circular solid base member 30. An axis of rotation 40 is defined perpendicular to and centered on the circular solid base member 30. A mechanical shaft coupler 45 is positioned where the axis of rotation 40 penetrates the circular solid base member 30. The mechanical shaft coupler 45 is configured to fixedly fasten the filter wheel 10 to a shaft that may be rotated by an actuator or motor 300. The rotational position of the filter wheel 10 may be determined and telemetered by sensors 12 located on, or in proximity to, the filter wheel 10. In an embodiment, the sensors 12 may be mounted directly to the shaft. The circular solid base member 30 is penetrated by a plurality of base apertures 50 whose centers are spaced about the circumference of a circle having a radius less than that of the circular solid base member. While eight apertures are illustrated, any number of apertures may be employed. Each of the base apertures 50 defines a first optical axis 60 perpendicular to and centered on the corresponding base member aperture 50. A first filter retaining structure 70 may be associated with each of the base apertures 50 and is configured to secure an optical filter 80 across the respective base member aperture 50. In a non-limiting embodiment, optical filter 80 may be a band pass filter that transmits light falling within a band of emission wavelengths while attenuating light having other wavelengths.

A plurality of dichroic reflector support structures 90, each associated with a corresponding base aperture 50, are integrated into the circular solid base member 30. Each of the dichroic reflector support structures 90 is configured to secure a separate dichroic reflector 100, centered on the first optical axis 60, below and at a predetermined angle with respect to the corresponding base member aperture 50. In a non-limiting embodiment, the predetermined angle is approximately forty-five degrees. The dichroic reflector 100 is selected to reflect light at the excitation wavelengths while transmitting light at the emission wavelengths. The dichroic reflector 100 is configured to change the direction of propagation of the excitation light, from the first optical axis 60 to a second optical axis 110. The second optical axis 110 is parallel to a radial line segment 120 extending from the center of the circular solid base member 30 to the center of the respective base member aperture 50.

A plurality of wall apertures 130 penetrate the cylinder wall 20 at points corresponding to each of the second optical axis 110 interception points. A second filter retaining structure 140 may be associated with each of the wall apertures 130 and configured to secure an optical filter 150 across the respective wall aperture 130. Optical filter 150 transmits excitation light wavelengths while attenuating other wavelengths.

In operation, the filter wheel 10 is employed as a component of an automated microscope system. The filter wheel assembly may comprise a plurality of optical component modules 15 positioned at angular intervals around the filter wheel. Each of the optical modules 15 further comprising the filters, dichroic reflectors, and apertures tuned for each of the excitation/emission frequency combinations. In an embodiment, the optical component modules 15 are formed as an integral portion of the filter wheel assembly. The filter wheel 10 is configured so that as it rotates about its axis of rotation 40, the first optical axis 60 of each of the successive base apertures sequentially comes into co-axial alignment with the microscope's optical axis. An excitation light source 160, external to the filter wheel, is configured to project light through wall aperture 130 toward the first optical axis 60. As the filter wheel 10 rotates, successive wall apertures 130 sequentially come into alignment with the excitation light source 160 thereby admitting the light into the interior of the cylinder. An optical filter 150, that selectively transmits light of a first wavelength while rejecting light at other wavelengths, may be located within the aperture 130. The admitted beam of light is filtered by optical filter 150 and then redirected by reflection from the corresponding dichroic reflector 100, coaxially with the first optical axis 60 thereby illuminating the specimen. The dichroic reflector 100 selectively reflects light of the first wavelength but transmits light at the second wavelength.

Portions of the specimen when exposed to excitation light at a first wavelength fluoresce at a second light wavelength.

Light returning from the specimen, at the second wavelength, along the first optical axis 60 is transmitted through the dichroic reflector 100 with a minimum reflection and propagates through the corresponding base member aperture 50. An optical filter 80, selectively transmitting light of the second wavelength, may be located within the aperture 50. The light exiting the base member aperture 50 propagates toward the objective lens section of the microscope.

In another embodiment, the excitation light filter 150 may not be required if the excitation light source 160 emits light having a sufficiently narrow band spectrum. Specifically tuned LEDs (light emitting diodes) or lasers may provide suitable narrow band light. Multiple narrow band light sources may be employed as required by the analysis protocol.

Figure 7:
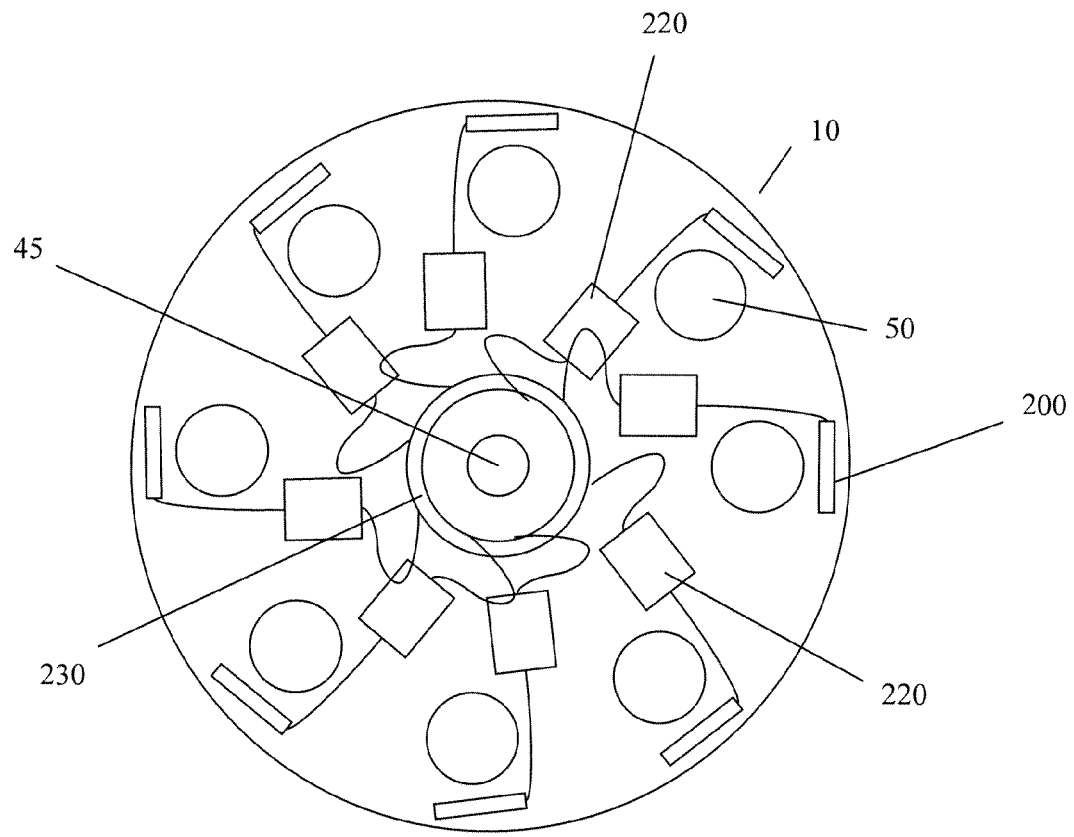
FIG. 7 is a simplified schematic diagram of a bottom view of an embodiment of a filter wheel comprising an individual excitation light source.
Figure 8:
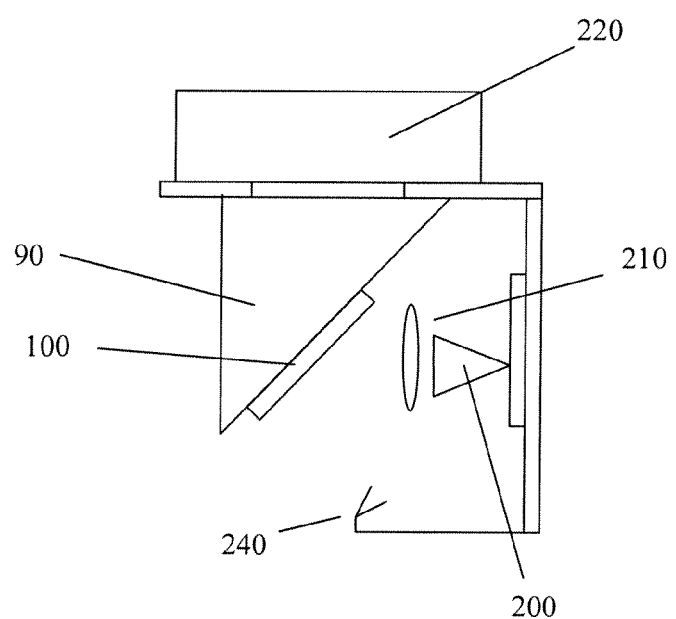
FIG. 8 is a simplified schematic diagram of a cutaway view of an embodiment of an optical component module having an individual excitation light source.

In additional embodiments, the external excitation light source 160 may be replaced by a plurality of individual excitation light sources 200 integrated into each of the optical modules 15 of the filter wheel assembly as shown in FIG. 7. The use of individual excitation light sources 200 permits each light source 200 to be optimized for a narrow spectrum range and power profile. As shown in FIG. 8, each optical component module 15 may comprise a narrow band excitation light source 200 in addition to filters, dichroic reflectors and apertures tuned for a specific excitation/emission light frequency combination. Each of the narrow band excitation light sources 200 may comprise one or more LEDs or lasers, or other suitable light source, and may further comprise selective wavelength filters 210. An associated electrical power conditioner 220 may provide electrical power, necessary to operate each of the narrow band excitation light sources 200. The power conditioner 220 may perform any or all of the following functions: electrical connection, rectification, regulation, voltage conversion, AC/DC or DC/AC conversion, or voltage adjustment. Each of the electrical power conditioners may obtain its primary power from a power source (not shown) located external to the filter wheel. In non-limiting embodiments, primary electrical power may be conveyed from the power source to the rotating filter wheel 10 by conduction using slip-rings (not-shown), or by inductive coupling using a rotary transformer 230. Alternatively, batteries or other energy storage devices mounted on the filter wheel may provide primary power for the filter wheel. Each of the electrical power conditioners 220, mounted on the filter wheel 10, converts the primary power to the electrical power format required by the corresponding excitation light source 200. In an embodiment, the light source 200 may be instrumented with sensors 240 for monitoring the performance and characteristics of the light source 200. The sensor outputs may be fed back to the electrical power conditioner 220 and used to adjust the output of each power conditioner 220 thereby maintaining excitation light characteristics.

STATEMENT REGARDING PREFERRED EMBODIMENTS

While the invention has been described with respect to preferred embodiments, those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features and/or technical background.

The invention claimed is:

1. A filter wheel apparatus comprising:
    a planar circular base member with a mechanical shaft coupler located at an axis of rotation defined perpendicular to and centered on said circular base member, said circular base member penetrated by a plurality of base apertures whose centers are angularly spaced about the circumference of a circle, said centers of each of said base apertures defining an aperture axis perpendicular to plane of said aperture, said planar circular base member further comprising a corresponding plurality of reflector support structures, each of said reflector support structures being located in proximity to each of said plurality of base apertures;
    a plurality of dichroic reflectors that transmit light at a first band of wavelengths and reflect light at a second band of wavelengths, each of said plurality of dichroic reflectors affixed to one of said reflector support structures and thereby intercepting said aperture axis and oriented at a predetermined angle relative to the plane of said base aperture.

2. The filter wheel apparatus, in accordance with claim 1, further comprising:
    a right circular cylinder member surrounding and attached to said planar circular base member thereby forming a cylindrical perpendicular wall;
    a plurality of wall apertures formed in said cylindrical perpendicular wall at angular locations corresponding to said plurality of base apertures, each of said wall apertures defining a wall aperture axis centered on and perpendicular to said wall aperture and intercepting a corresponding dichroic reflector.

3. The filter wheel apparatus, in accordance with claim 2, wherein said right circular cylinder member is formed integrally with said planar circular base member.

4. The filter wheel apparatus, in accordance with claim 1, wherein each base aperture comprises an optical filter.

5. The filter wheel apparatus, in accordance with claim 1, wherein each wall aperture comprises an optical filter.

6. The filter wheel apparatus, in accordance with claim 1, wherein each said reflector support structure further comprises an individual excitation light source oriented to radiate toward said dichroic reflector.

7. The filter wheel apparatus, in accordance with claim 6, wherein said individual excitation light source is at least one light emitting diode (LED).

8. The filter wheel apparatus, in accordance with claim 6, wherein said individual excitation light source is at least one laser.

9. The filter wheel apparatus, in accordance with claim 6, wherein said planar circular base member further comprises at least one electrical power conditioner, said at least one power conditioner electrically connected to said individual excitation light source.

10. The filter wheel apparatus, in accordance with claim 9, wherein said planar circular base member further comprises a portion of a rotary transformer, said portion of rotary transformer electrically connected to said electrical power conditioner.

* * * * *